(12) United States Patent
Bucking

(10) Patent No.: US 9,709,087 B2
(45) Date of Patent: Jul. 18, 2017

(54) PRELOAD LOSS PREVENTION SYSTEM FOR A CLAMPING BALL STUD

(71) Applicant: BorgWarner Inc., Auburn Hills, MI (US)

(72) Inventor: Michael Bucking, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/811,243

(22) Filed: Jul. 28, 2015

(65) Prior Publication Data

US 2017/0030401 A1    Feb. 2, 2017

(51) Int. Cl.
*F16C 11/06*    (2006.01)

(52) U.S. Cl.
CPC ...... *F16C 11/0604* (2013.01); *F16C 11/0614* (2013.01); *F16C 11/0695* (2013.01)

(58) Field of Classification Search
CPC ... F16C 11/06; F16C 11/0614; F16C 11/0695; F16C 11/0661; Y10T 403/32606; Y10T 403/32631; Y10T 403/32819; Y10T 403/32836; Y10T 403/32844; Y10T 403/32852; Y10T 403/32951; Y10T 403/32959; Y10T 403/32967
See application file for complete search history.

(56) References Cited

U.S. PATENT DOCUMENTS

| 2,771,300 | A | * | 11/1956 | Latzen | ...................... | B62D 7/16 |
| | | | | | | 280/93.508 |
| 3,034,810 | A | * | 5/1962 | Primeau | .............. | F16C 11/0619 |
| | | | | | | 280/86.756 |
| 3,039,786 | A | * | 6/1962 | Punches | ................... | B62D 7/16 |
| | | | | | | 280/93.508 |
| 4,231,588 | A | * | 11/1980 | Wotton | .................. | B62D 17/00 |
| | | | | | | 280/86.756 |
| 4,232,880 | A | * | 11/1980 | Dickerson | .............. | B62D 17/00 |
| | | | | | | 280/86.756 |
| 4,509,772 | A | * | 4/1985 | Drotar | .................... | B62D 17/00 |
| | | | | | | 280/86.756 |
| 4,915,530 | A | * | 4/1990 | Tomlinson | ............... | B62D 7/18 |
| | | | | | | 280/93.512 |
| 5,011,351 | A | | 4/1991 | Terry | | |

(Continued)

FOREIGN PATENT DOCUMENTS

DE    102013208245 A1    11/2014
DE    102013216728 A1    12/2014
(Continued)

*Primary Examiner* — Matthieu F Setliff
(74) *Attorney, Agent, or Firm* — BrooksGroup

(57) ABSTRACT

A product that may include a first linked element that may have an opening that may have a coaxial counter bore. A collar may be included and may have a parti-spherical section and may have a countersunk section that may extend into the counter bore. A stud may have a sphere-like section and may be engaged with the parti-spherical section. The stud may include a shank extending from the sphere-like section and through the collar and the opening. A fastener may be engaged with the shank, and the collar and the first linked element may be compressed between the sphere-like section and the fastener. A second linked element may be included and may have a race within which the sphere-like section may be engaged.

22 Claims, 2 Drawing Sheets

(56) References Cited

U.S. PATENT DOCUMENTS

| | | | |
|---|---|---|---|
| 5,326,322 A | | 7/1994 | Fechter |
| 5,509,749 A | | 4/1996 | Eifert et al. |
| 5,976,141 A | * | 11/1999 | Haag ............... A61B 17/8047 606/292 |
| 6,505,990 B1 | | 1/2003 | Maughan |
| 6,530,711 B2 | | 3/2003 | Menotti |
| 6,652,179 B2 | | 11/2003 | De Freitas |
| 6,719,312 B2 | * | 4/2004 | Thompson ............... B62D 7/16 280/93.511 |
| 6,814,521 B2 | | 11/2004 | Suzuki et al. |
| 6,851,688 B2 | * | 2/2005 | Barry ...................... B62D 7/16 280/93.51 |
| 6,866,441 B2 | | 3/2005 | Yokoyama |
| 7,393,152 B2 | * | 7/2008 | Sellers ................... B60G 7/005 403/133 |
| 8,714,861 B2 | | 5/2014 | Bernhardt et al. |
| 2006/0133891 A1 | | 6/2006 | Cook |
| 2011/0217112 A1 | | 9/2011 | Seol et al. |
| 2013/0287478 A1 | | 10/2013 | Shibata et al. |

FOREIGN PATENT DOCUMENTS

| | | |
|---|---|---|
| WO | 2014005941 A1 | 1/2014 |
| WO | 2014172144 A1 | 10/2014 |

\* cited by examiner

PRELOAD LOSS PREVENTION SYSTEM FOR A CLAMPING BALL STUD

TECHNICAL FIELD

The field to which the disclosure generally relates includes mechanical linking devices and more particularly, includes maintaining preload in linking devices.

BACKGROUND

Ball studs may be used to mechanically link components with angularity variations.

SUMMARY OF ILLUSTRATIVE VARIATIONS

According to a number of illustrative variations, a product may include a first linked element that may have an opening that may have a coaxial counter bore. A collar may be included and may have a parti-spherical section and may have a countersunk section that may extend into the counter bore. A stud may have a sphere-like section and may be engaged with the parti-spherical section. The stud may include a shank extending from the sphere-like section and through the collar and the opening. A fastener may be engaged with the shank, and the collar and the first linked element may be compressed between the spherical section and the fastener. A second linked element may be included and may have a race within which the spherical section may be engaged.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
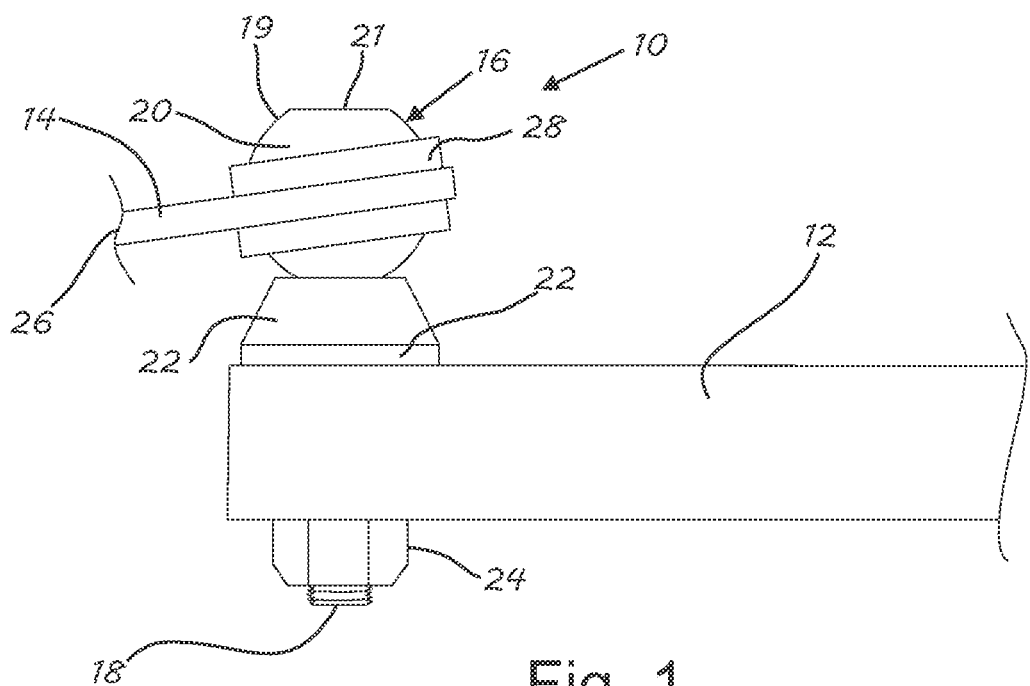
FIG. 1 is an illustration of a product according to a number of variations.

In a number of variations as illustrated in FIG. 1, a product 10 may include a first linked element 12 that may be linked to a second linked element 14 through a stud 16. The second linked element 14 may be disposed at an angle relative to the first linked element 12 or may move through a number of angles relative thereto. The stud 16 and may include a section that serves as a shank 18 that may extend through the first linked element 12. The stud 16 may include head 19 with a spherical section 20 that may be connected to or formed as one piece with the shank 18. The spherical section 20 may not be in the form of a complete sphere due to the connected shank 18 and a flat end 21, and the stud 16 may generally be a ball stud that may not be perfectly spherical but may be sphere-like. A collar 22 may be disposed around the shank 18 and may be positioned between the spherical section 20 and the first linked element 12. A fastener 24 may be engaged with the shank 18 and may hold the stud 16 to the first linked element 12. The shank 18 may be provided with threads and the fastener 24 may be torqued or otherwise secured on the shank 18 so that a preload is applied. The preload may result in the shank 18 being placed in tension, and the collar 22 and fastener 24 may be compressed between the head 19 and the first linked element 12. The shank 18 may include a limited area for grip length due to space limitations or other design requirements. The second linked element 14 may include lever section 26 and a race section 28. The race section 28 may be engaged around the head 19 of the stud 16 wherein the first linked section 12 is connected to the second linked section 14 so that relative pivoting and twisting and rotating of the first linked element 12 and the second linked element 14 may be provided.

The product 10 may provide a tension joint where the stud 16 and the components clamped between the head 19 and the fastener 24, which may include the collar 22 and the first linked component 12, may be subjected to dynamic loads which may be cyclic. A clamping preload may be applied to maintain a secure joint under the applied forces, which may be accomplished by torqueing the fastener 24 on the shank 18. Expansion of the joint due to thermal cyclic loading may occur, particularly in applications such as turbochargers. The product 10 may provide an advantageously long grip length which may provide preferred maintenance of the preload. An applied load operating on the joint of the product 10 with a longer shank 18 extension, may provide a larger residual preload, as compared to a shorter shank extension. To maintain the larger residual preload, a number of variations may involve maximizing the shank length within the design limitations.

Figure 2:
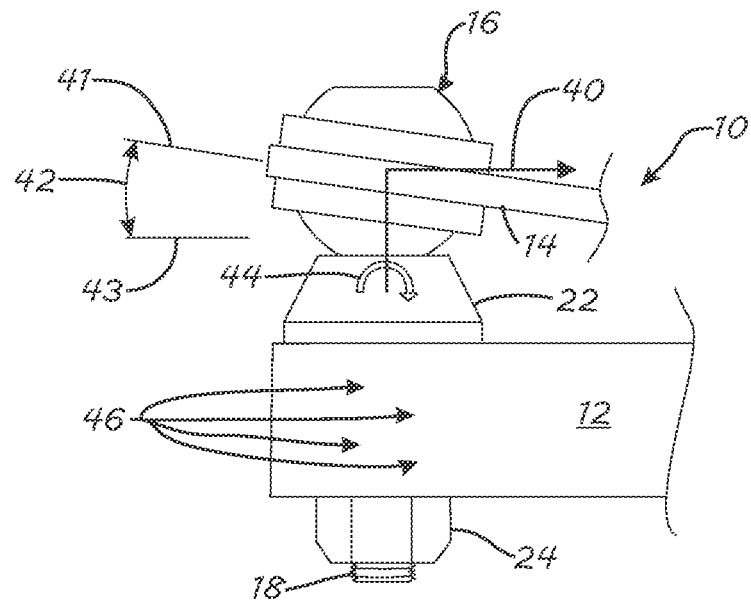
FIG. 2 is a graphical joint diagram according to a number of variations.

Referring to FIG. 2, a diagram illustrates that the product 10 may operate under prying conditions. The second linked section 14 may result in a force 40 applied to the stud 16. Orientation of the second linked section 14 relative to the first linked section 12 may result in a prying condition at a prying angle 42. The prying angle 42 may be measured from a line 43 parallel to the first linked section 12 to a line 41 parallel to the second linked section 14. The prying condition may apply a moment 44 to the product 10, and non-linear zones 46 of tension and compression may result along the shank 18 within the first linked section 12. A close fit between the collar 22 and the shank 18 may help mitigate stress caused by the prying condition by containing deflection of the shank 18.

Figure 3:
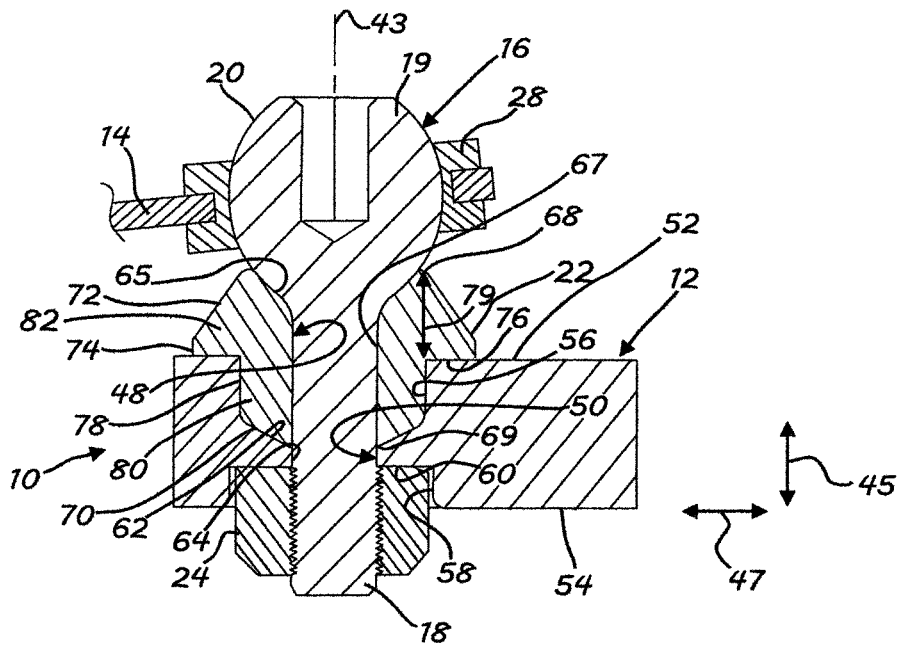
FIG. 3 is a cross sectional illustration of a product taken through the center of a stud according to a number of variations.

In the description of the product 10 elements may be defined in relation to a longitudinal direction 45 and a transverse direction 47 as designated in FIG. 3. The longitudinal direction 45 may be described as coinciding with the direction of a line along which the stud 18 extends. The transverse direction 47 may be described as coinciding with the direction of a line that extends across the stud 18 or generally perpendicular to the longitudinal direction 45. In a number of variations of the product 10 as illustrated in FIG. 3, the stud 16 may extend through an opening 48 in the collar 22 and through an opening 50 in the first linked element 12. The first linked element 12 may have a first side 52 and a second side 54, and the opening 50 may extend through the first linked element 12 from the first side 52 to the second side 54. The opening 50 may be defined by a first longitudinal wall 56 that may extend into the first linked element 12 from the first side 52 in the longitudinal direction 45, and may generally define a counter bore. A second longitudinal wall 58 may extend into the first linked element 12 from the second side 54 in the longitudinal direction 45 and may generally define a counter bore. A transverse wall 60 may extend from the second longitudinal wall 58 and into the opening 50 in the transverse direction 47. An angled wall 62 may extend from the first longitudinal wall 56 and into the opening 50 and may be angled toward the second side 54. A third longitudinal wall 64 may extend from the angled wall 62 to the transverse wall 60 in the longitudinal direction 45. The third longitudinal wall 64 may be coaxial with the first longitudinal wall 56 and the second longitudinal wall 58 with regard to an axis 43 that may extend through the center of the opening 50 in the longitudinal direction 45.

The collar 22 may define the opening 48, which may extend through the collar in the longitudinal direction 45. The opening 48 may have a parti-spherical section 65, which may define part of a sphere, and a cylindrical section 67 that may extend from the parti-spherical section 65 toward the fastener 24. The part-spherical section 65 may match the outer surface of the head 19. The parti-spherical section 65 may terminate at a first edge 68 of the collar 22 and the cylindrical section 67 may terminate at a second edge 69 of the collar 22 opposite the first edge 68. An angled surface 70 may extend from the second edge 69 and radially outward in relation to the axis 43. The angled surface 70 may mate with and against the angled wall 62. A tapered surface 72 may extend from the first edge 68 radially outward relative to the axis 43 and toward the first side 52 of the first linked element 12. The tapered surface 72 may permit a maximum angular orientation of the second linked element 14 relative to the first linked element 12, with the race 28 moving around the spherical section 20. A perimeter surface 74 may extend from the tapered surface 72 in the longitudinal direction 45 toward the first linked element 12. A transverse surface 76 may extend from the perimeter surface 74 radially inward relative to the axis 43. The transverse surface 76 may be compressed against the first side 52 of the first linked element 12. A longitudinal surface 78 may extend between the transverse surface 76 and the angled surface 70. The longitudinal surface 78 may be positioned adjacent and may fit closely against the first longitudinal wall 56. The spherical section 20 of the stud 16 may mate against the collar 22 at the parti-spherical section 65. The fastener 24 may be engaged with the shank 18 and may be compressed against the transverse wall 60 so that the spherical section 20 may be forced against the collar 22 at the parti-spherical section 65. The collar 22 may extend the grip length of the stud 16 a distance 79, thereby increasing the residual preload experienced when the product 10 may be subjected to loads from interaction with the race section 28, which may be pivotably engaged on the spherical section 20, and connected with, or formed as a part of the second linked element 14. The collar 22 may include a countersunk portion 80 that may distribute loads to the first linked element 12 within the opening 50, and may include a flange portion 82 that may distribute loads to the first linked element 12 at the first side 52.

Figure 4:
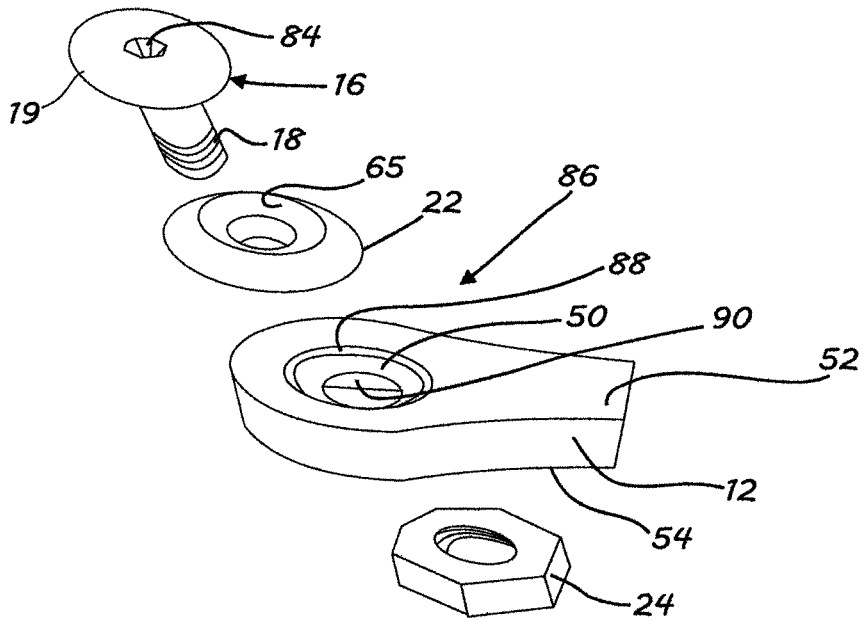
FIG. 4 is an exploded perspective view of a product according to a number of variations.

In a number of variations as illustrated in FIG. 4, the stud 16 may be a ball stud and may include a hex opening 84 for applying torque and preloading the joint 86 by compressing the collar 22 and the first linked element 12 between the head 19 and the fastener 24. The collar 22 may be generally annular in shape and may include the parti-spherical section 65 for receiving a part of the head 19. The first linked element 12 may include the opening 50 with a coaxial counter bore 88 from the first side 52 that may receive the countersunk portion 80, and a coaxial counter bore 90 from the second side 54 that may receive the fastener 24. When the fastener 24 may be torqued on the stud 16 and positioned within the counter bore 90, the collar 22 and the first linked element 12 may be compressed while the shank 18 may be extended. As the shank 18 and compressed elements are preloaded, they may perform elastically and may act as springs with a spring constant.

Through the foregoing, a product 10 may inhibit loss of the preload (fastener tension), in a ball stud with a space limited grip length. The grip length may be maximized by utilization of a collar 22, which may also distribute loads and stress effectively throughout the product 10 and its joint 86. Maximized grip length may accommodate the use of materials with dissimilar mechanical properties for the individual components of the joint 86 while maintaining the preload. Angularity between the first linked element 12 and the second linked element 14 may result in bending moments on the joint 86 which may be accommodated through the compressed elements. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a first linked element that may have an opening that may have a coaxial counter bore. A collar may be included and may have a parti-spherical section and may have a countersunk section that may extend into the counter bore. A stud may have a sphere-like section and may be engaged with the parti-spherical section. The stud may include a shank extending from the sphere-like section and through the collar and the opening. A fastener may be engaged with the shank, and the collar and the first linked element may be compressed between the sphere-like section and the fastener. A second linked element may be included and may have a race within which the sphere-like section may be engaged.

Variation 2 may include the product according to variation 1 wherein the first linked element may have a first side and a second side. The coaxial counter bore may extend through the first side and a second counter bore may extend through the second side. The fastener may extend into the second counter bore.

Variation 3 may include the product according to variation 1 or 2 wherein the coaxial counter bore may include an angled wall and the countersunk section may be engaged against the angled wall.

Variation 4 may include the product according to any of variations 1 through 3 wherein the collar may include an edge adjacent the parti-spherical section that may be spaced apart from the first linked element and may extend the grip length of the stud.

Variation 5 may include the product according to variation 4 wherein the collar may have a tapered surface that may extend from the edge radially outward and toward the first linked element.

Variation 6 may include the product according to any of variations 1 through 5 wherein the opening may be partly defined by a longitudinal wall that may be disposed adjacent to the shank.

Variation 7 may include the product according to any of variations 1 through 6 wherein the collar may include a flange section that may be positioned against the first linked element.

Variation 8 may include the product according to any of variations 1 through 7 wherein the second linked element may be disposed at an angle relative to the first linked element.

Variation 9 may include the product according to any of variations 1 through 8 wherein the fastener may be threaded onto the shank.

Variation 10 may include the product according to any of variations 1 through 9 wherein the first linked element may include a longitudinal wall in the coaxial counter bore and the countersunk portion may be engaged against the longitudinal wall distributing forces between the first and second linked elements.

Variation 11 may include a product that may have a first linked element that may define an opening extending through the first linked element. A collar may extend into the opening and may extend out of the opening and away from the first linked element to an edge. A stud may be included that may have a head and a shank. The head may be positioned away from the first linked element by the collar a distance to the edge. The shank may extend through the collar and the first linked element. A fastener may be connected with the shank. The collar and the linked element may be compressed between the head and the fastener. A second linked element may have a race that may be engaged with the head linking the first and second linked elements.

Variation 12 may include the product according to variation 11 wherein the first linked element may have a first side and a second side. A first counter bore may extend through the first side and a second counter bore may extend through the second side. The collar may extend into the first counter bore. The fastener may extend into the second counter bore.

Variation 13 may include the product according to variation 12 wherein the first counter bore may include an angled wall and the collar may be engaged against the angled wall.

Variation 14 may include the product according to any of variations 11 through 13 wherein the collar may have a tapered surface that may extend from the edge radially outward and toward the first linked element.

Variation 15 may include the product according to any of variations 11 through 14 wherein the opening may be partly defined by a longitudinal wall that may be disposed adjacent to the shank.

Variation 16 may include the product according to any of variations 11 through 16 wherein the collar may include a flange section that may be positioned against the first linked element.

Variation 17 may include the product according to any of variations 11 through 16 wherein the second linked element may be disposed at an angle relative to the first linked element.

Variation 18 may include the product according to any of variations 11 through 17 wherein the fastener may be threaded onto the shank.

Variation 19 may include the product according to any of variations 11 through 18 wherein the first linked element may include a longitudinal wall in the coaxial counter bore and the collar may include a countersunk portion engaged against the longitudinal wall that may distribute forces between the first and second linked elements.

Variation 20 may include a product that may include a first linked element that may have a first side and a second side. A first opening may extend through the first linked element from the first side to the second side. The first opening may be defined by a first longitudinal wall that may extend into the first linked element from the first side, a second longitudinal wall that may extend into the first linked element from the second side, a transverse wall that may extend from the second longitudinal wall and into the first opening, an angled wall that may extend from the first longitudinal wall and into the first opening and angled toward the second side, and a third longitudinal wall that may extend from the angled wall to the transverse wall. The third longitudinal wall may be coaxial with the first longitudinal wall and the second longitudinal wall. A collar may define a second opening that may extend through the collar. The opening may have a parti-spherical section and a cylindrical section extending from the parti-spherical section. The parti-spherical section may terminate at a first edge of the collar. The cylindrical section may terminate at a second edge of the collar opposite the first edge. An angled surface may extend from the second edge radially outward. The angled surface may mate with the angled wall. A tapered surface may extend from the first edge radially outward and toward the first side. A perimeter surface may extend from the tapered surface longitudinally. A transverse surface may extend from the perimeter surface. The transverse surface may be compressed against the first side. A longitudinal surface may extend between the transverse surface and the angled surface. The longitudinal surface may be positioned against the first longitudinal wall. A stud may have a spherical section and may have a shank section extending from the spherical section. The shank section may extend through the first and second openings. The spherical section may mate against the collar at the parti-spherical section. A fastener may be engaged with the shank section. The fastener may be compressed against the transverse wall so that the spherical section may be forced against the collar at the parti-spherical section. A race may be pivotably engaged on the spherical section. The race may be connected with a second linked element.

What is claimed is:
1. A product comprising:
a first linked element that has a first opening with a coaxial counter bore, the counter bore being coaxial with the first opening;
a collar that has a second opening with a section that is shaped like part of a sphere, and that has a countersunk section extending into the coaxial counter bore;
a stud that has a head that is ball shaped and that is engaged with the section that is shaped like part of a sphere, and a shank extending from the head through the second opening of the collar;
a fastener engaged with the shank, the collar and the first linked element compressed between the head and the fastener; and
a second linked element having a race within which the head is engaged, wherein the coaxial counter bore includes a longitudinal wall that extends into the first linked element from an external surface of a first side of the first linked element, and that is parallel to an axis extending through a center of the head and the shank, and the coaxial counter bore includes an angled wall at an end of the longitudinal wall opposite the external surface, and the countersunk section of the collar is engaged against the longitudinal wall and the angled wall.

2. The product according to claim 1 wherein the first linked element has a second side, and wherein the coaxial counter bore extends through the first side and a second counter bore extends through the second side, wherein the fastener extends into the second counter bore.

3. The product according to claim 1 wherein the collar includes an edge that is disposed adjacent the section that is shaped like part of a sphere and that is disposed at the head, the edge being spaced apart from the first linked element extending the grip length of the stud a distance.

4. The product according to claim 3 wherein the collar has a tapered surface extending from the edge radially outward and toward the first linked element.

5. The product according to claim 1 wherein the external surface faces the head, wherein the first opening is partly defined by the longitudinal wall which extends into the first linked element from the external surface, the first linked element has a second side facing away from the head with the first opening partly defined by a second longitudinal wall extending into the first linked element from the second side, and the first opening is partly defined by a third longitudinal wall disposed adjacent to the shank, and the third longitudinal wall has first and second ends with the angled wall extending from the first end to the first longitudinal wall and a transverse wall perpendicular to the third longitudinal wall and extending from the second end to the second longitudinal wall.

6. The product according to claim 1 wherein the first side faces the head and wherein the collar includes a flange section that has a transverse surface facing the first side and positioned against the first linked element on the first side and outside the first opening.

7. The product according to claim 1 wherein the second linked element is disposed at variable angles relative to the first linked element with the race engaged around the head wherein the second linked element pivots relative to the first linked element.

8. The product according to claim 1 wherein the fastener is threaded onto the shank and is positioned inside the first opening.

9. The product according to claim 1 wherein the longitudinal wall is disposed parallel to the shank, and the countersunk section is engaged against the longitudinal wall distributing forces between the first and second linked elements.

10. A product comprising:
a first linked element that has a first side and defines an opening extending through the first linked element from the first side;
a collar extending into the opening through the first side and the collar has an edge, wherein the collar extends out of the opening away from the first side of the first linked element to the edge;
a stud that has a head and a shank, the stud terminates at a first end, and at a second end opposite the first end, the head forms a ball shaped section of the stud and is disposed at, and forms, the first end, and the ball shaped section is positioned away from the first linked element by the collar a distance from the first side to the edge, wherein the ball shaped section of the head engages the collar, including at the edge and the shank extends from a connection with the head at the ball shaped section to the second end, the shank having a diameter from the connection with the head to the second end that is constant, and the shank extends through the collar and the first linked element;
a fastener connected with the shank, the collar and the first linked element compressed between the head and the fastener; and
a second linked element that has a race engaged with the head linking the first and second linked elements, wherein the first linked element has a second side and wherein a first counter bore extends through the first side and a second counter bore extends through the second side, wherein the collar extends into the first counter bore and wherein the fastener extends into the second counter bore, and wherein the first counter bore includes a longitudinal wall that extends into the first linked element from an external surface of the first side, and that is parallel to an axis extending through a center of the head and the shank, and the first counter bore includes an angled wall at an end of the longitudinal wall opposite the external surface, and the collar is engaged against the longitudinal wall and the angled wall.

11. The product according to claim 10 wherein the collar has a tapered surface extending from the edge radially outward away from the shank and toward the first linked element to the first side.

12. The product according to claim 10 wherein the second end has a threaded section onto which the fastener is threaded.

13. The product according to claim 10 wherein the collar includes a flange section extending from the edge outward away from the shank and positioned against the first linked element.

14. The product according to claim 10 wherein the collar includes a counter sunk portion positioned inside the opening and a flange portion positioned outside the opening and against the first side of the first linked element, the flange portion having an axial opening that has a part spherical section and a cylindrical section, the part spherical section receiving the head and shaped to mate with the ball shape of the head and the cylindrical section receiving the shank.

15. The product according to claim 10 wherein the fastener is threaded onto the shank and is positioned inside the opening.

16. The product according to claim 10 wherein an axis extends longitudinally through a center of the stud, wherein the collar includes an angled surface facing the second linked element at an angle to permit the second linked element to pivot through a range of angular orientations relative to the first linked element, while simultaneously, the collar extends a grip length of the stud along the axis from the head to the fastener the distance between the head and the first linked element to increase a residual preload of the stud along the axis.

17. The product according to claim 16 wherein the angled surface has a first end at the ball shaped section and a second end disposed toward the first linked element from the ball shaped section, wherein the first end is closer to the axis than the second end.

18. The product according to claim 17, wherein the first end is further from the first linked element than the second end.

19. The product according to claim 16 wherein an open space extends from an entirety of the angled surface to the second linked surface.

20. The product according to claim 10 wherein the stud is attached to the first linked element with the collar positioning the ball shaped section on the first side of the first linked element, the collar contacting the first side and the collar contacting the ball shaped section and extending around a part of the ball shaped section.

21. A product comprising:
   a first linked element that has a first side and defines an opening extending through the first linked element from the first side;
   a collar extending into the opening through the first side and the collar has an edge, wherein the collar extends out of the opening away from the first side of the first linked element to the edge;
   a stud that has a head and a shank, the head has a ball shaped section and is positioned away from the first linked element by the collar a distance from the first side to the edge, wherein the ball shaped section of the head engages the collar, including at the edge and the shank extending through the collar and the first linked element;
   a fastener connected with the shank, the collar and the first linked element compressed between the head and the fastener; and
   a second linked element that has a race engaged with the head linking the first and second linked elements,
   wherein the stud exists around an axis extending through a center of the head and the shank, and the first linked element defines a coaxial counter bore that includes a longitudinal wall within the coaxial counter bore that is formed by a cylindrical section of the first linked element, wherein the longitudinal wall is parallel with the axis, and the collar includes a countersunk portion engaged against the longitudinal wall distributing forces between the first and second linked elements.

22. A product comprising:
   a first linked element that has a first side and a second side and that defines a first opening extending through the first linked element from the first side to the second side, the first opening defined by a first longitudinal wall extending into the first linked element from the first side, a second longitudinal wall extending into the first linked element from the second side, a transverse wall perpendicular to the longitudinal wall and extending from the second longitudinal wall and into the first opening, an angled wall extending from the first longitudinal wall and into the first opening and angled toward the second side, and a third longitudinal wall extending from the angled wall to the transverse wall, the third longitudinal wall coaxial with the first longitudinal wall and the second longitudinal wall;
   a collar that defines a second opening extending through the collar, the second opening having a first section that is partially spherical and a cylindrical section extending from the first section, the first section terminating at a first edge of the collar outside the first opening and the cylindrical section terminating at a second edge of the collar opposite the first edge and inside the first opening, an angled surface extending from the second edge radially outward, the angled surface mating with the angled wall, a tapered surface extending from the first edge radially outward away from the second opening and toward the first side, a perimeter surface extending from the tapered surface longitudinally, a transverse surface extending from the perimeter surface and disposed perpendicular to the perimeter surface, the transverse surface compressed against the first side, and a longitudinal surface extending between the transverse surface and the angled surface, the longitudinal surface positioned against the first longitudinal wall and disposed perpendicular to the transverse surface;
   a stud that has a spherical section and that has a shank section extending from the spherical section, the shank section extending through the first and second openings, the spherical section mating against the collar at the first section, and at the first edge;
   a fastener engaged with the shank section, the fastener compressed against the transverse wall so that the spherical section is forced against the collar at the first section; and
   a race, pivotably engaged on the spherical section, the race connected with a second linked element.

* * * * *